(12) United States Patent
Born

(10) Patent No.: US 8,831,682 B2
(45) Date of Patent: Sep. 9, 2014

(54) WIRELESS DETECTOR AND ADAPTER

(76) Inventor: Joseph Born, Lincolnwood, IL (US)

(*) Notice: Subject to any disclaimer, the term of this patent is extended or adjusted under 35 U.S.C. 154(b) by 127 days.

(21) Appl. No.: 12/565,070

(22) Filed: Sep. 23, 2009

(65) Prior Publication Data

US 2010/0074239 A1    Mar. 25, 2010

Related U.S. Application Data

(63) Continuation of application No. 11/104,008, filed on Apr. 11, 2005, now abandoned.

(51) Int. Cl.
*H04B 1/38*     (2006.01)
*H04W 48/16*   (2009.01)
*H04M 1/725*   (2006.01)

(52) U.S. Cl.
CPC ............ *H04W 48/16* (2013.01); *H04M 1/7253* (2013.01)
USPC .......................................................... 455/557

(58) Field of Classification Search
CPC ... H04W 52/0251; H04W 4/001; H04W 4/12; H04B 7/0697
USPC ....................................................... 455/557
See application file for complete search history.

(56) References Cited

U.S. PATENT DOCUMENTS

| | | | |
|---|---|---|---|
| 6,317,594 B1 | 11/2001 | Gossman et al. | 455/414 |
| 6,389,474 B1 | 5/2002 | Chien et al. | 709/232 |
| 6,674,403 B2 | 1/2004 | Gray et al. | 342/463 |
| 6,754,488 B1 | 6/2004 | Wo et al. | 455/424 |
| 7,519,984 B2* | 4/2009 | Bhogal et al. | 726/2 |
| 7,720,044 B1* | 5/2010 | Rainisto | 370/349 |
| 2002/0008610 A1* | 1/2002 | Peterson | 340/5.64 |
| 2003/0204748 A1 | 10/2003 | Chiu | 713/201 |
| 2004/0132446 A1* | 7/2004 | Seedman et al. | 455/426.2 |
| 2004/0170122 A1 | 9/2004 | Guo et al. | 370/210 |
| 2004/0203549 A1 | 10/2004 | Lee et al. | 455/226 |
| 2005/0080974 A1* | 4/2005 | Lin | 710/315 |
| 2005/0107144 A1 | 5/2005 | Dvorak | 455/575.6 |
| 2005/0187714 A1 | 8/2005 | Brulle-Drews | 702/3 |
| 2007/0016647 A1* | 1/2007 | Gupta et al. | 709/206 |

* cited by examiner

*Primary Examiner* — Duc Nguyen
*Assistant Examiner* — Ankur Jain
(74) *Attorney, Agent, or Firm* — Clifford Kraft

(57) ABSTRACT

The handheld wireless network detector and adaptor includes a housing at least partially enclosing a processor, a self-contained power source, an interface, a wireless transceiver, a wireless network detector and a wireless network adapter. The interface is configured to communicate with an external computing device. The wireless transceiver is configured for transmitting and receiving radio signals. The wireless network detector is configured to use the wireless transceiver to detect a presence of a detected wireless network. The wireless network adapter is configured for facilitating real time communication between the external computing device and the detected wireless network via the interface and said wireless transceiver.

1 Claim, 7 Drawing Sheets

WIRELESS DETECTOR AND ADAPTER

RELATED APPLICATIONS

This application is a continuation application and claims priority to U.S. patent application Ser. No. 11/104,008, filed Apr. 11, 2005, now abandoned which is incorporated by reference herein.

BACKGROUND

1. Field

The present invention relates to wireless networking, and in particular to a hand held sized wireless network communications device that is configured to act as both a stand-alone wireless network detector and as a network adapter coupled to an external computing device, such as a personal computer.

2. Introduction

Wireless communications have become a ubiquitous part of modern life. Every day millions of people around the world use wireless telephones, pagers, cellular telephones, wireless personal digital assistants, wireless headsets, and other wireless communication devices and services.

Recently, wireless networking has begun to supplement and replace some hard-wired network infrastructures, such as Local Area Networks (LANs), which traditionally connected via cables. One of the major benefits of a wireless LAN (WLAN) infrastructure is the increased portability of computing devices used within such an infrastructure. Wireless network users are free to roam within a set distance from a wireless access point without losing connectivity to the WLAN. An added benefit is that wireless network users no longer need to carry cables and connectors to connect to a network.

WLANs typically include one or more wireless computing devices and wireless access points (WAPs). Each WAP includes a wireless transceiver for communicating with the computing devices via radio signals. Typically, the WAP connects to a larger wired network infrastructure, such as the Internet, through a hardwired interconnection. In addition, each of the computing devices includes, or is connected to, a wireless PC card or wireless network adapter that also contains a wireless transceiver for communicating with the WAP via radio signals. These computing devices typically include laptop or notebook computers, desktop computers, peripherals, such as printers, and more increasingly handheld devices, such as Personal Digital Assistants (PDAs).

Unlike cellular telephone and data networks, WLANs have a limited communication range. For example, the 802.11b and 802.11g wireless protocols are typically limited to about 150 ft indoors and about 300 ft outdoors; the 802.11a wireless protocol is limited to a range of about 50 ft indoors and 100 ft outdoors; while the BLUETOOTH wireless protocol has an effective range of about 32 ft. That said, obstructions, such as brick walls and metal frames, as well as interference from microwave ovens and other equipment greatly decreases these ranges. The range or geographic area covered by a WAP is know at a "hotspot." Local wireless networks or hotspots have sprung up in homes, workplaces, public spaces, and businesses, such as fast-food restaurants, coffee shops, airports and, recently, airlines.

Such wireless networks may be public or private; open or closed; free or paid; or encrypted or non-encrypted. Public networks are open to the public, while private networks allow access only to a private group of users. Open wireless networks are public networks that are accessible without the need to have previously subscribed to the wireless network, while closed wireless networks are networks that require registration or subscription. Paid networks require the payment of a periodic or one time fee, unlike free networks which don't.

However, other than by printed signs or informational Web-sites, potential wireless network users typically have no way of knowing the location of hotspots. If a user happens to be in a hotspot, he still may not be able to easily tell whether the network is active, whether the wireless signal extends to his physical location, whether he may access the network, or whether the signal strength is adequate to permit a reliable connection to be made with the network. The user also is not able to easily determine the nature of the network, the wireless protocols used, and whether the wireless network is public or private; open or closed; free or paid; or encrypted or non-encrypted.

Until recently, identifying a wireless network typically required a user to unpack a laptop computer; insert a wireless adapter or card, such as a PCMCIA card; turn the computer on; wait for the computer to boot; perform any necessary network configuration; and thereafter launch network access software, such as a Web-browser, to finally access the wireless network. Clearly, performing such steps is extremely time consuming and frustrating for users, especially when it is determined that there is no wireless network available or that the network is inaccessible.

Recently, however, stand-alone wireless network detectors have been developed to notify users of the presence of a wireless network without the need to perform the above-mentioned steps. However, such separate wireless network detectors require the user to carry around the additional network detector, in addition to a laptop, network adapter and other hardware, thereby increasing user inconvenience and diminishing the mobile computing experience. Moreover, the network detector is an additional expense for the mobile network user. Accordingly, it would be highly desirable to reduce the complexity and cost of mobile computing while increasing user efficiency and convenience.

The information disclosed in this Invention section is only for enhancement of understanding of the invention and should not be taken as an acknowledgement or any form of suggestion that this information forms part of the prior art that is already known in this country to a person of ordinary skill in the art.

SUMMARY

According to an embodiment of the invention, there is provided a wireless communication device that includes a housing at least partially enclosing a processor, a self-contained power source, an interface, a wireless transceiver, a wireless network detector and a wireless network adapter. The interface is configured to communicate with an external computing device. The wireless transceiver is configured for transmitting and receiving radio signals. The wireless network detector is configured to use the wireless transceiver to detect a presence of a detected wireless network. The wireless network adapter is configured for facilitating real time communication between the external computing device and the detected wireless network via the interface and said wireless transceiver. These and other features of the present teachings are set forth herein.

According to another embodiment of the invention, there is provided another wireless communication device that includes a housing at least partially enclosing a number of components electrically coupled to one another via a bus. The components include a processor, a power source, an interface, a wireless transceiver, a wireless network detector and a wireless network adapter. The power source is self-contained. The interface is configured for wired communication with an external computing device. The wireless transceiver is configured for transmitting and receiving radio signals, while the wireless network detector is configured for at least detecting a presence of a detected wireless network. The wireless network adaptor is configured for facilitating wireless communication between the external computing device and the detected wireless network.

There are great cost savings to be realized by combining the functionality of a network detector and a network adapter, as the two devices share many of the same components. In addition, by combining the functionality of the network detector and adapter, it's possible for the device to have more enhanced stand-alone as well as enhanced adapter functionality. The detector can give more complete information about the network (encryption, etc.) as well as potentially perform some simple synchronization functionality such as sending email, etc. Providing a more powerful microprocessor within the communication device not only allows the device to function more capably as a stand alone unit, but also yields the additional benefit of being a more robust adapter requiring less host processor utilization.

DRAWINGS

The skilled artisan will understand that the drawings, described below, are for illustration purposes only. The drawings are not intended to limit the scope of the present teachings in any way.

DESCRIPTION OF VARIOUS EMBODIMENTS

Figure 1:
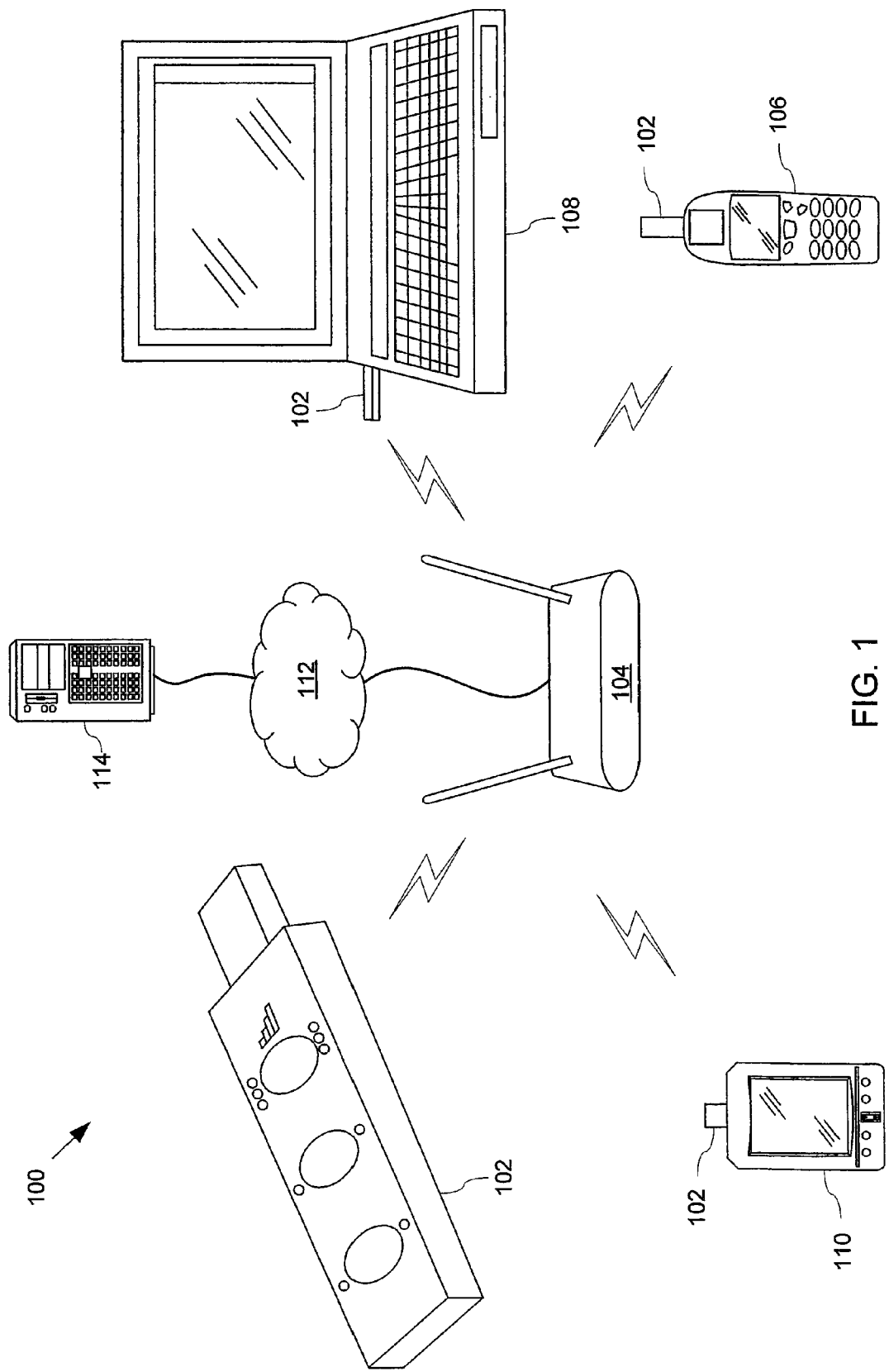
FIG. 1 is a system diagram of a wireless network, according to an embodiment of the present invention.

For a better understanding of the nature of the invention, reference should be made to the following detailed description, taken in conjunction with the accompanying drawings. Like reference numerals refer to corresponding parts throughout the several views of the drawings. Furthermore, aspects of the present teachings may be further understood in light of the examples described below, which should not be construed as limiting the scope of the present teachings in any way.

FIG. 1 is a system diagram of a wireless network 100. In some embodiments, the wireless network includes a wireless access point or WAP 104. The WAP 104 communicates with a communication device 102 and with one or more wireless enabled computing devices. The one or more computing devices are configured to communicate wirelessly with the WAP 104, and may include laptop computers 108, or handheld computing devices, such as a PDA 110 and a cellular telephone (cellphone) 106. The WAP 104 acts as a base station in the wireless LAN (WLAN), and may be a stand-alone device that is hardwired to an Ethernet hub or server that may in turn be hardwired to a larger network, such as the Internet 112. In some embodiments, the computing devices are able to roam and be handed-off from one WAP to another.

In some embodiments, the communication device 102 is a key-fob sized communication device, i.e., the communication device 102 is dimensioned to couple to a user's key chain and has a size about or smaller than a pack of chewing-gum. In some embodiments, the communication device 102 is configured to perform one or more of the following functions as a stand-alone device: detect the presence of a wireless network; analyze the network to determine its nature and characteristics; check a remote server, such as an email account, for new messages; download any new messages from the remote server; transmit messages to a remote server; upload data to a remote server; and download data from a remote server. These functions are described in further detail below in relation to FIGS. 4A-4C.

In some embodiments, the communication device 102 may also be coupled to an external computing device to act as a wireless network adapter for the computing device. For example, the communication device 102 plugs into the bus of any one of the PDA 110, cellphone 106 or laptop computer 108 in the wireless network 100. In these embodiments, the communication device 102 controls the transmission and receipt of data modulated on radio waves to and from the computing device to which it is attached. Accordingly, the communication device 102 may function as either a standalone device or as network adapter when plugged into an external computing device.

FIG. 2 is a block diagram of the communication device 102 shown in FIG. 1. The communication device 102 contains a plurality of components, such as at least one central processing unit (CPU) 202, a memory 204, wireless transceiver 206 coupled to a wireless antenna 208, a self-contained power source 210, a wireless network adapter 212, a wireless network detector 214, input and/or output devices 216, a wired interface 218, and at least one bus 222 that connects the aforementioned components. These components are at least partially housed within a housing 200. In some embodiments, the housing has the size of a key fob. Also in some embodiments, the housing has a width of less than two times the width of a male USB series A plug (2×15.7 mm) and a height of less than four times the height of a male USB series A plug (4×7.5 mm).

The wireless transceiver 206 includes a transmitter and receiver configured for transmitting and receiving radio signals via the antenna 208. The power source 210 is any suitable self-contained power source such as one or more disposable or rechargeable batteries. The wireless network adapter 212 may include hardware and/or software for facilitating communication between an external computing device and the wireless network. Part or all of any wireless network adapter software may be stored in the memory 204 as wireless adapter procedures 230. In some embodiments, the wireless network adapter 212 forms at least part of a printed circuit board that controls communication at the data link level (OSI layers 1 and 2) between an external computing device and the wireless network.

In some embodiments, the wireless network adapter 212 communicates with an external computing device via the wired interface 218. In these embodiments, the wired interface 218 is coupled to the external computing device via a hard-wired communication port 224. In some embodiments, this communication port 224 is a male Universal Serial Bus (USB) series A plug. In other embodiments, the communication port 224 is a IEEE 1394 (FIREWIRE) male connector. In other embodiments, the communication port is a PCMCIA connector.

The wireless network detector 214 may include hardware and/or software for detecting the presence of a wireless network, and if a wireless network exists, determining the network characteristics, such as type, protocols, open/closed, public/private, free/pay, etc. Part or all of any wireless network adapter software may be stored in the memory 204 as wireless detector procedures 232. The wireless network detector 214 analyzes radio signals received by the wireless transceiver 206 to identify any wireless networks. Further details of the functionality of the wireless network detector 214 are described below in relation to FIGS. 2B and 4A-4C.

The input and/or output devices 216 may include one or more buttons, lights, LEDs, a small LCD display or the like. The input and/or output devices 216 may also include a sound generator and/or speaker for generating audible signals. One embodiment of the input and output devices is described below in relation to FIG. 2B.

The memory 204 may comprise Random Access Memory (RAM) and/or Read Only Memory (ROM). The memory 204 preferably includes an operating system 226 which has instructions for communicating, processing, accessing, storing, or searching data. Examples of suitable operating systems include embedded LINUX or a proprietary or scaled-down operating system. In addition, memory 204 preferably includes communication procedures 228, wireless adapter procedures 230, wireless detector procedures 232, a message database 234, an upload database 236, a download database 238, security procedures 240, configuration procedures 242, message procedures 244, transfer procedures 246, a conflict management algorithm 247, a file storage database 249, and a cache 248 for temporarily storing data.

The communications procedures 228 are used for communicating with the WAP 104 (FIG. 1) and the computing devices 106, 108 and 110 (FIG. 1). The wireless adapter procedures 230 are used for facilitating communication between the external computing devices 106, 108 and 110 (FIG. 1) and the WAP 104 (FIG. 1). The wireless detector procedures 232 are used for detecting the presence of a wireless network and for analyzing any detected networks. The message database 234 is used for temporarily storing both incoming messages (inbox) received from a remote server 114 (FIG. 1), such as emails received from an email server, and outgoing messages (outbox) instant messages received from an external computing device for transmittal to a remote server 114 (FIG. 1). The upload database 236 is used to temporarily store data received from an external computing device for onward transmittal to a remote server, such as an FTP or weblog server. The download database 238 temporarily stores data that has been downloaded from a server for onward transmittal to the external computing device. It should be appreciated that any suitable upload download protocols and synchronization schemes may be used, such as MICROSOFT's offline file synchronization.

The security procedures 240 are used for encrypting the content of the memory in case the communication device is lost or stolen. The configuration procedures 242 are used for allowing the communication device 102 to be configured by the external computing device coupled to it via the interface 218. The message procedures 244 are used to check, receive and transmit messages. For example, the message procedures may include basic email client software. The transfer procedures 246 are used to receive and transfer data to the remote server. For example, the transfer procedures 246 may include basic FTP client software. The conflict management algorithm 247 is used to determine which data/emails/messages or the like are to be copied, overwritten, or deleted should any conflicts exist. For example, if a duplicate file exists, the conflict management algorithm determines which copy to keep, etc. The file storage database 249 is used as a file storage area for storing user's data files. Details of the use of the above-mentioned procedures are described below with reference to FIGS. 4A-4C.

Figure 2A:
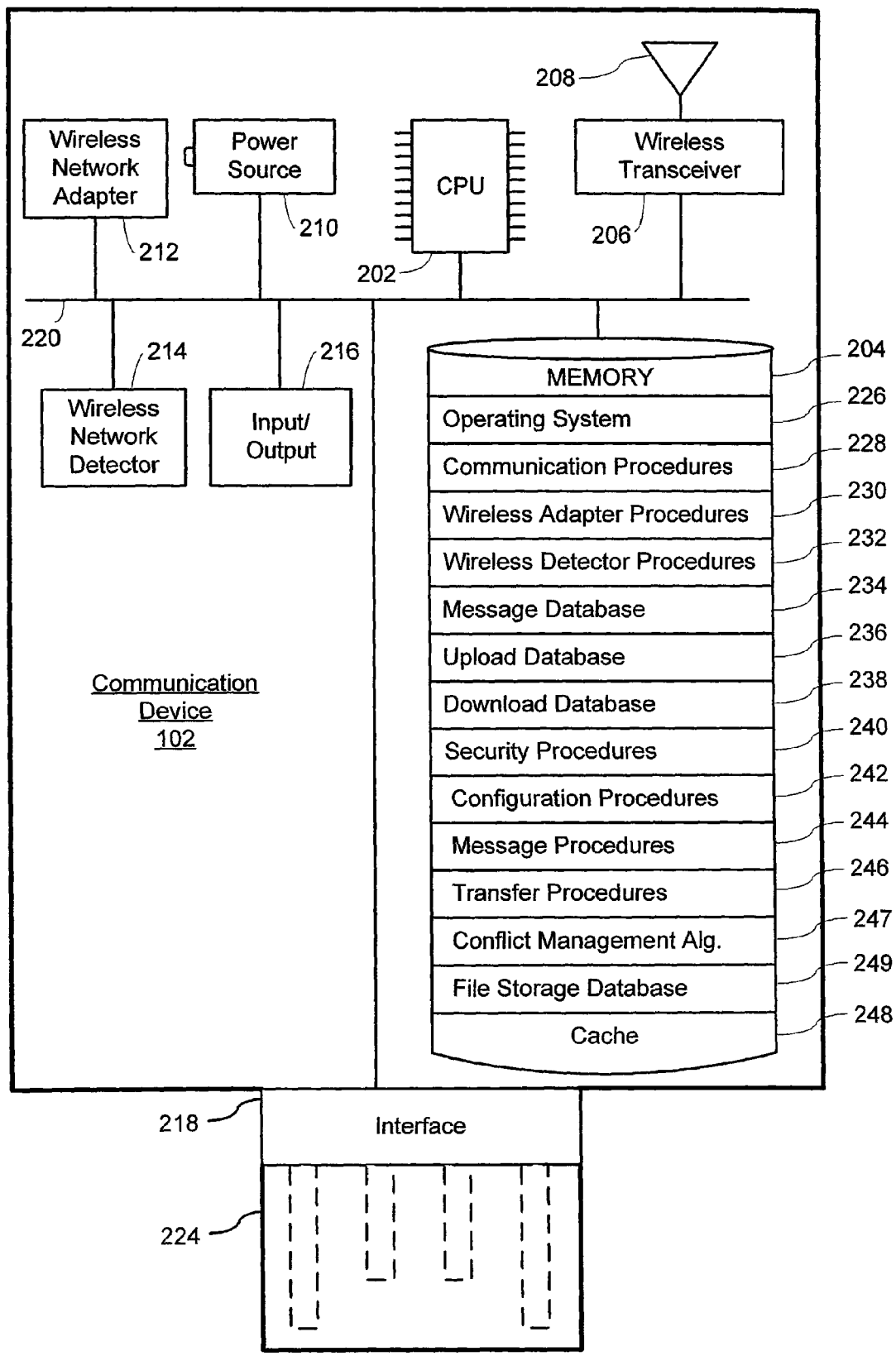
FIG. 2A is a block diagram of the communication device shown in FIG. 1.
Figure 2B:
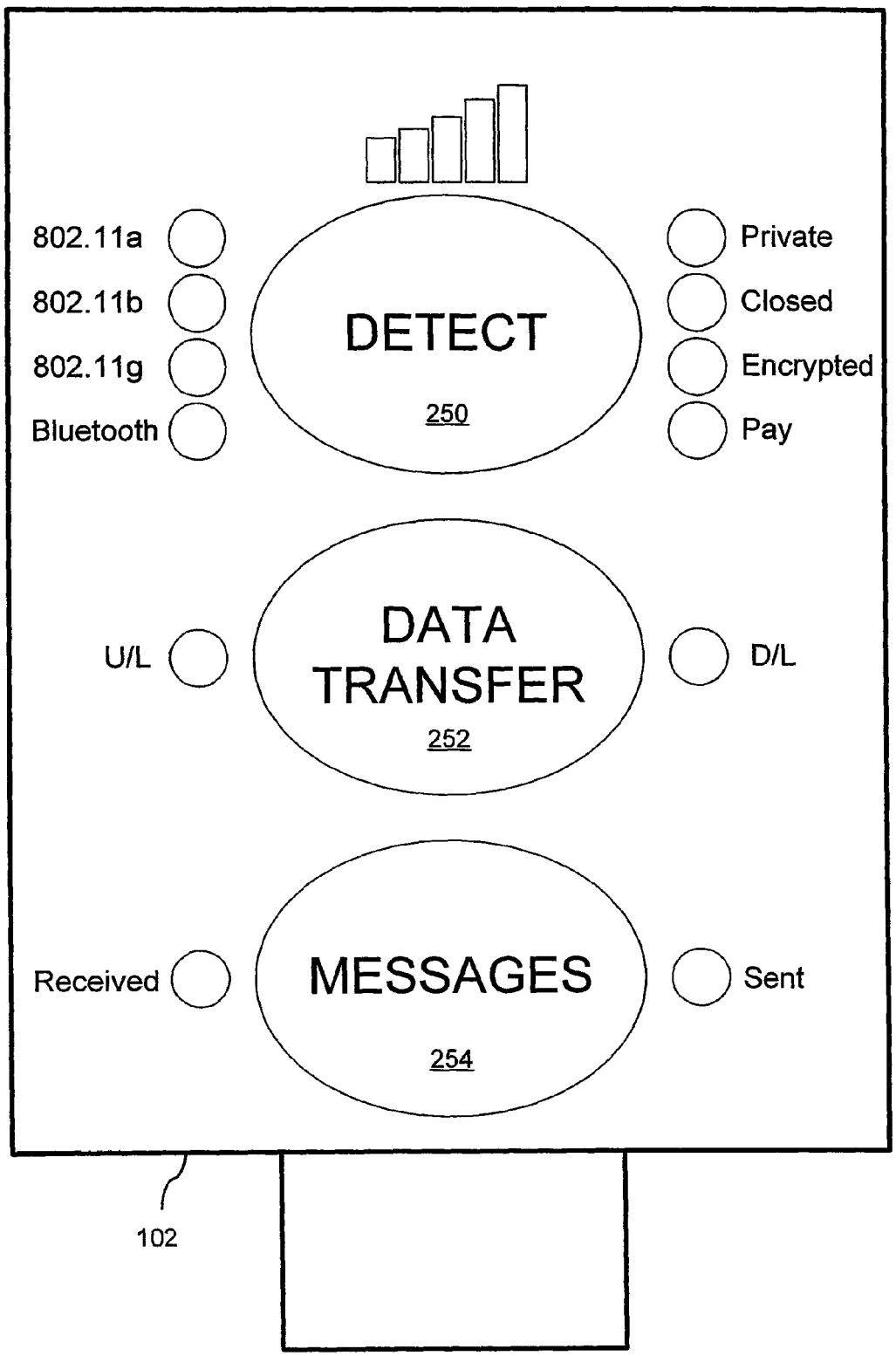
FIG. 2B is a top view of the communication device shown in FIG. 1.

FIG. 2B is a top view of the communication device 102 shown in FIG. 1. In some embodiments, the communication device includes multiple input devices 216 (FIG. 2A), including a "detect" button 250, a "data transfer" button 252, and an "messages" button 254. In some embodiments, the communication device includes multiple output devices 216 (FIG. 2A), including LEDs for indicating: the strength of the network (shown by the graduated bars); the network protocol in use, i.e., 802.11a, 802.11b, 802.11g or BLUETOOTH; whether the network is public or private; whether the network is open or closed; whether the network is encrypted or non-encrypted; whether the network is free or not; whether data has successfully been uploaded (U/L) to the remote server; whether data has successfully been downloaded (D/L) from the remote server; whether outgoing messages (including emails and instant messages) have been successfully transmitted to an external server; and whether incoming messages (including email and instant messages) have been successfully received from an external server. It should, however, be appreciated that fewer or more inputs and/or outputs may be provided.

Figure 3:
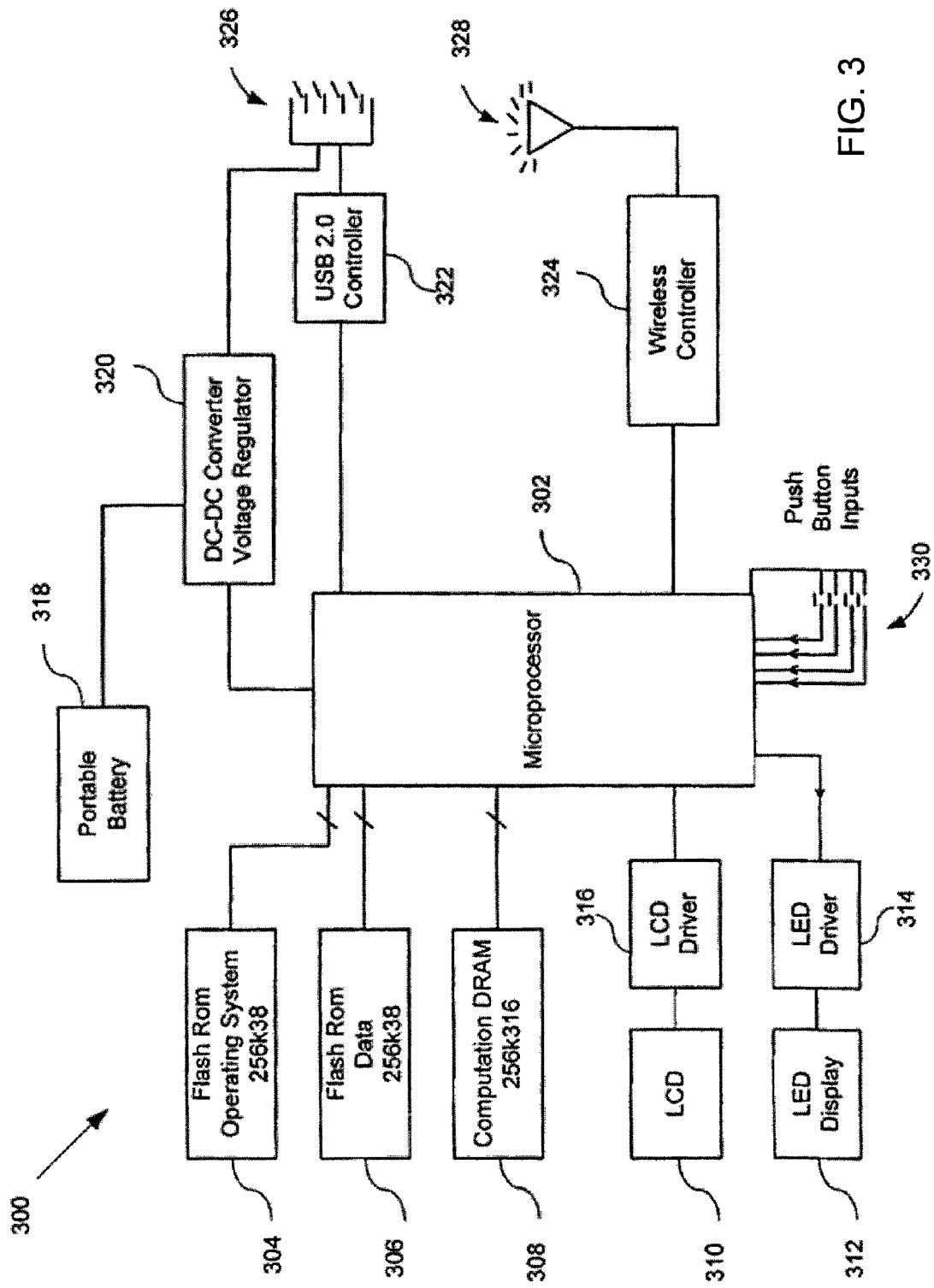
FIG. 3 is a block diagram of another communication device 300, according to another embodiment of the invention.

FIG. 3 is a block diagram of another communication device 300. This communication device 300 includes many of the same components as the communication device 102 (FIGS. 1 and 2). In particular, the communication device 300 includes a microprocessor 302, flash read only memory (ROM) 304 and 306, dynamic random access memory (DRAM) 308, a liquid-crystal display (LCD) 310, an LCD driver 316, a light emitting diode (LED) display 312, an LED driver 314, a portable battery 318, a DC to DC converter and voltage regulator 320, a USB controller 322, a WiFi or Bluetooth controller 324, a USB port 326, an antenna 328 and push button inputs 330. The microprocessor 302 is coupled to the Flash read only memory (ROM) 304 and 306, dynamic random access memory (DRAM) 308, a an LCD driver 316, an LED driver 314, a DC to DC converter and voltage regulator 320, a USB controller 322, a WiFi or Bluetooth controller 324, and push button inputs 330. The portable battery 318 is coupled to the voltage regulator 320. The USB port 326 is coupled to the voltage regulator 320 and USB controller 322. The WiFi/Bluetooth controller 324 is coupled to the antenna 328. The LCD driver 316 is coupled to the LCD display. The LED driver 314 is coupled to the LED display 312.

In some embodiments, the microprocessor 302 is a Intel 8086, while the portable battery is a 3V lithium coin cell type 2032 battery. In use, the battery is charged while connected to a USB port of a host device. The Flash ROM may include a Flash ROM 304 containing the operating system and a Flash ROM 306 containing other data. The DRAM 308 may be used for computation. In some embodiments, the LCD driver 316 is a Holter HT1670 and the LCD display 310 is a 4000 dot display. Also in some embodiments, the voltage regulator 320 is a Holtek HT 7738. The USB controller 322 may be a Micrel 2550A and the WiFi/Bluetooth controller may be a Broadcom 94317. The antenna 328 may extend from the communication device 300 or it may be printed onto the device's circuit board.

Figure 4A:
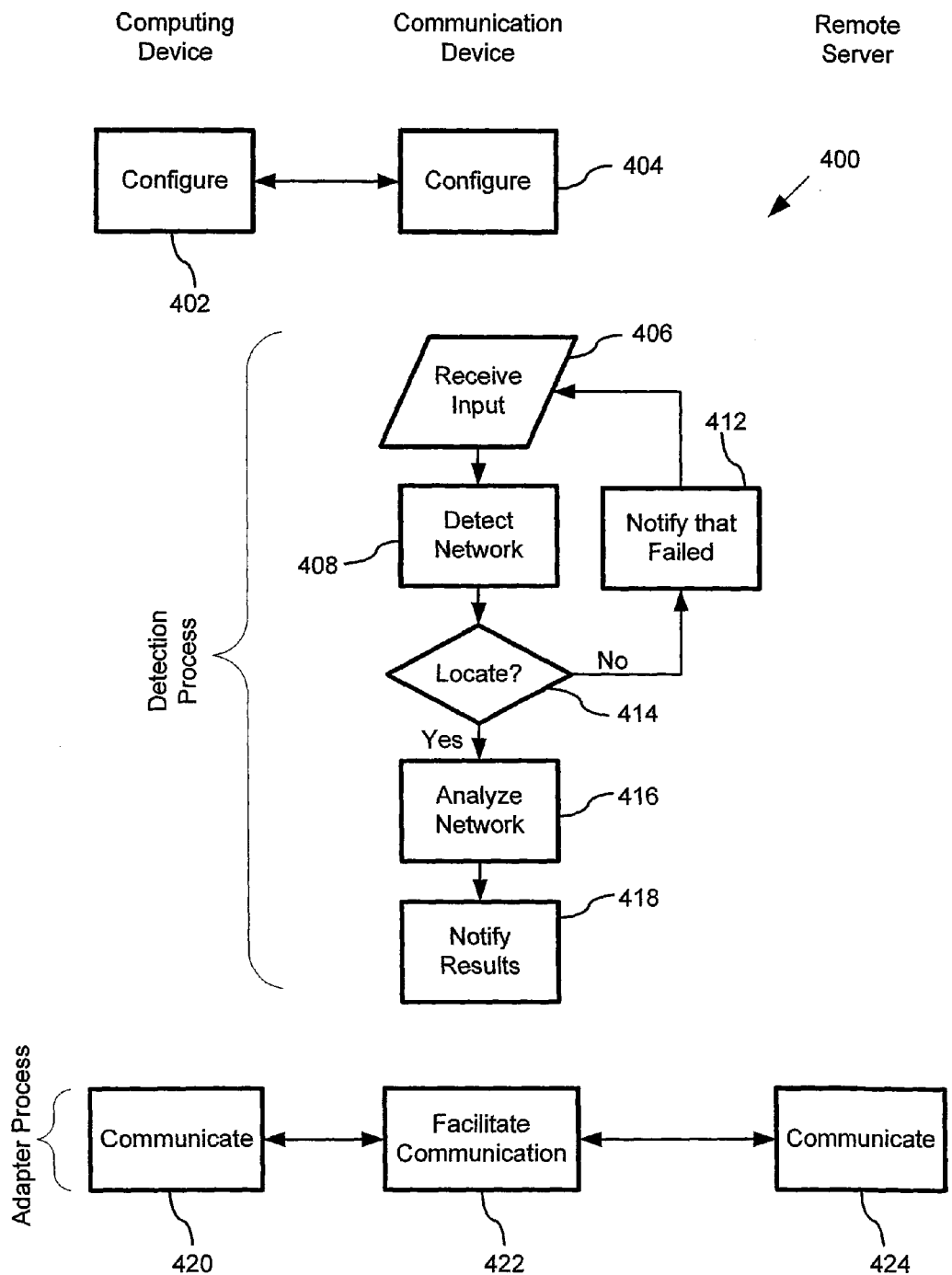
FIG. 4A is a flow chart of a method for detecting a wireless network, according to an embodiment of the invention.

FIG. 4A is a flow chart of a method 400 for detecting the presence and characteristics of a wireless network. At any time, the communication device 102 (FIG. 1) may be plugged into an external computing device 106, 108 or 110 (FIG. 1). Thereafter, the external computing device can be used to configure the communication device at steps 402 and 404. For example, the external computing device can be provided with Service Set Identifiers (SSIDs) or encryption keys for wireless networks to which a user of the external computing device has subscribed. This may allow both the wireless network adapter 212 (FIG. 2) and the wireless network detector 214 (FIG. 2) to hidden, private or encrypted wireless networks. The configuration process 402, 404 may also be used to configure the communication device 102 (FIG. 1) to automatically detect for a wireless network once every predetermined period, such as every 5 minutes. This allows the communication device to automatically send and/or receive messages or data whenever a wireless network is detected.

Also at any time, especially when the communication device is not coupled to an external computing device, i.e., when acting as a stand-alone device, a user can select the "detect" button 250 (FIG. 2B) to initiate a wireless network detection process. Once the detect button is depressed, the communication device receives the input, at step 406, and the wireless detector procedures 232 (FIG. 2A) in combination with the wireless network detector 214 (FIG. 2A) proceed to detect the presence of one or more wireless networks at step 408. If a wireless network is not located (414—No), then the user is notified of a failure to detect a network, at step 412, and the process repeated. Notification may take the form of displaying an LED indicating that no wireless network was located.

If a wireless network is located (414—Yes), then the wireless detector procedures 232 (FIG. 2A) in combination with the wireless network detector 214 (FIG. 2A) proceed to analyze the detected wireless network at step 416. Analysis of the network may include determining: the strength of the network; the type of network, i.e., 802.11a, 802.11b, 802.11g or BLUETOOTH; whether the network is public or private; whether the network is open or closed; whether the network is encrypted or non-encrypted; and/or whether the network is free or not. The user is then notified of the results of the analysis at step 418. For example, the user may be notified via LEDs, such as those shown in FIG. 2B. Alternatively, the user may be notified by an audible sound, such as a "beep" when a WiFi hot zone is available.

Again at any time, the communication device 102 (FIG. 1) may be plugged into an external computing device 106, 108 or 110 (FIG. 1). For example, the communication device 102 may be plugged into a female type A USB socket in a laptop computer 108 (FIG. 1). Thereafter, the same communication device 102 (FIG. 1) may be used as a network adapter for the external computing device, i.e., the wireless adapter procedures 230 (FIG. 2A) and the wireless network adapter 212 (FIG. 2A) may be used to facilitate communication 422 between the external computing device 420 and a remote server 114 (FIG. 1) via the WAP 104 (FIG. 1). Accordingly, the same communication device 102 (FIG. 1) may be used as both a stand-alone wireless network detector and a wireless network adapter for an external computing device. A single device eliminates the drawbacks of purchasing and carrying two separate devices.

Figure 4B:
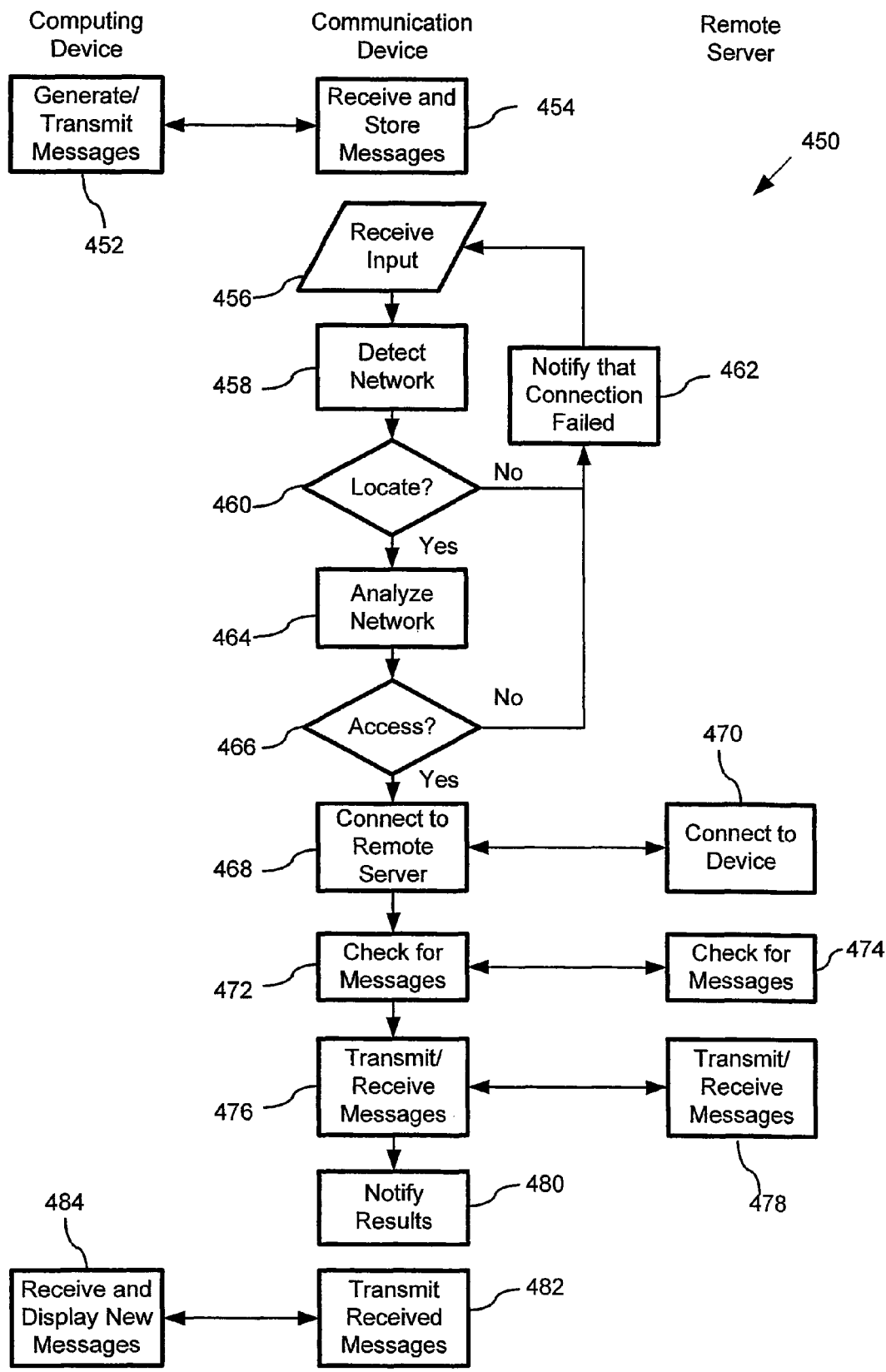
FIG. 4B is a flow chart of a method for synchronizing messages, according to an embodiment of the invention.

FIG. 4B is a flow chart of a method 450 for checking messages. At any time, the communication device 102 (FIG. 1) may be plugged into an external computing device 106, 108 or 110 (FIG. 1). Thereafter, the computing device may transmit messages, such as email or instant messages, to the communication device at steps 452. The communication device then receives and stores the received messages in the message database 234 (FIG. 2A) at step 454. These messages are any messages that a user of an external computing device wants to send, but cannot send immediately, as no network connection exists when the messages are generated. For example, a user may generate email messages on her laptop while travelling on an airplane that does not have Internet access. These email messages are then transmitted to the communication device, such as via a USB connection, for later transmittal to an email server. Before landing, the user can disconnect the communication device from the laptop and pack the laptop away.

Also at any time, especially when the communication device is not coupled to the external computing device, i.e., when it is acting as a stand-alone device, a user can select the "messages" button 254 (FIG. 2B) to synchronize messages between the communication device and a remote server 114. Once the messages button is depressed, the communication device receives the input, at step 456, and the wireless detector procedures 232 (FIG. 2A) in combination with the wireless network detector 214 (FIG. 2A) proceed to detect the presence of one or more wireless networks at step 458. If a wireless network is not located (460—No), then the user is notified of such a failure at step 462, and the process is repeated. Notification may take the form of displaying an LED indicating that no wireless network was located.

If a wireless network is located (460—Yes), then the wireless detector procedures 232 (FIG. 2A) in combination with the wireless network detector 214 (FIG. 2A) proceed to analyze the detected wireless network at step 464. Analysis of the network may include determining: the strength of the network; the type of network, i.e., 802.11a, 802.11b, 802.11g or BLUETOOTH; whether the network is public or private; whether the network is open or closed; whether the network is encrypted or non-encrypted; and/or whether the network is free or not.

The results of the analysis indicate whether the connection device can access the network at step 464. For example, if the network communicates using supported protocols and the network is free and public, the communication device may access the network. Also, if the communication device had previously been configured at step 404 (FIG. 4A) to access private or non-free wireless networks, then the communication device can access the wireless network. If the detected wireless network cannot be accessed (466—No), then the user is notified of such a failure at step 462, and the process is repeated. Notification may take the form of displaying an LED indicating that access failed.

If the detected wireless network can be accessed (466—Yes), then the communication procedures 228 (FIG. 2A) and the message procedures 244 (FIG. 2A) on the communication device connect to the remote server 114 (FIG. 1) via the WAP 104 (FIG. 1) at step 468. Similarly, the remote server connects to the communication device 102 (FIG. 1) via the WAP 104 (FIG. 1) at step 470. The message procedures 244 (FIG. 2A) then check the remote server for new messages at steps 472 and 474. The message procedures 244 (FIG. 2A) then transmit any messages stored in the message database 234 (FIG. 2A) to the remote server, at step 476, which receives the messages at step 478. Similarly, the remote server transmits any new messages to the communication device, at step 478, which receives them at step 476. The communication device then notifies the user of the receipt or transmittal of messages at step 480. For example, the communication device illuminates LED's displaying that messages were received or sent, as shown in FIG. 2B. Alternatively, the LCD display 310 (FIG. 3) may display the from and subject fields of new emails in order to allow a user to know the contents of the email messages without having to connect the device to a host device, such as a laptop computer.

At any time thereafter, the user may plug the communication device into an external computing device and have the communication device transmit the received messages to the external computing device at step 482. These new messages are received by the external computing device and displayed to the user at step 484.

In an alternative embodiment, user never needs to press the "messages" button 254 (FIG. 2B). Rather, the communication device periodically attempts to detect an accessible wireless network. Once an accessible wireless network has been detected, messages are automatically sent and/or received by the communication device. Users may be alerted of new mail by an audible signal generated by an audio output device 216 (FIG. 2A).

Figure 4C:
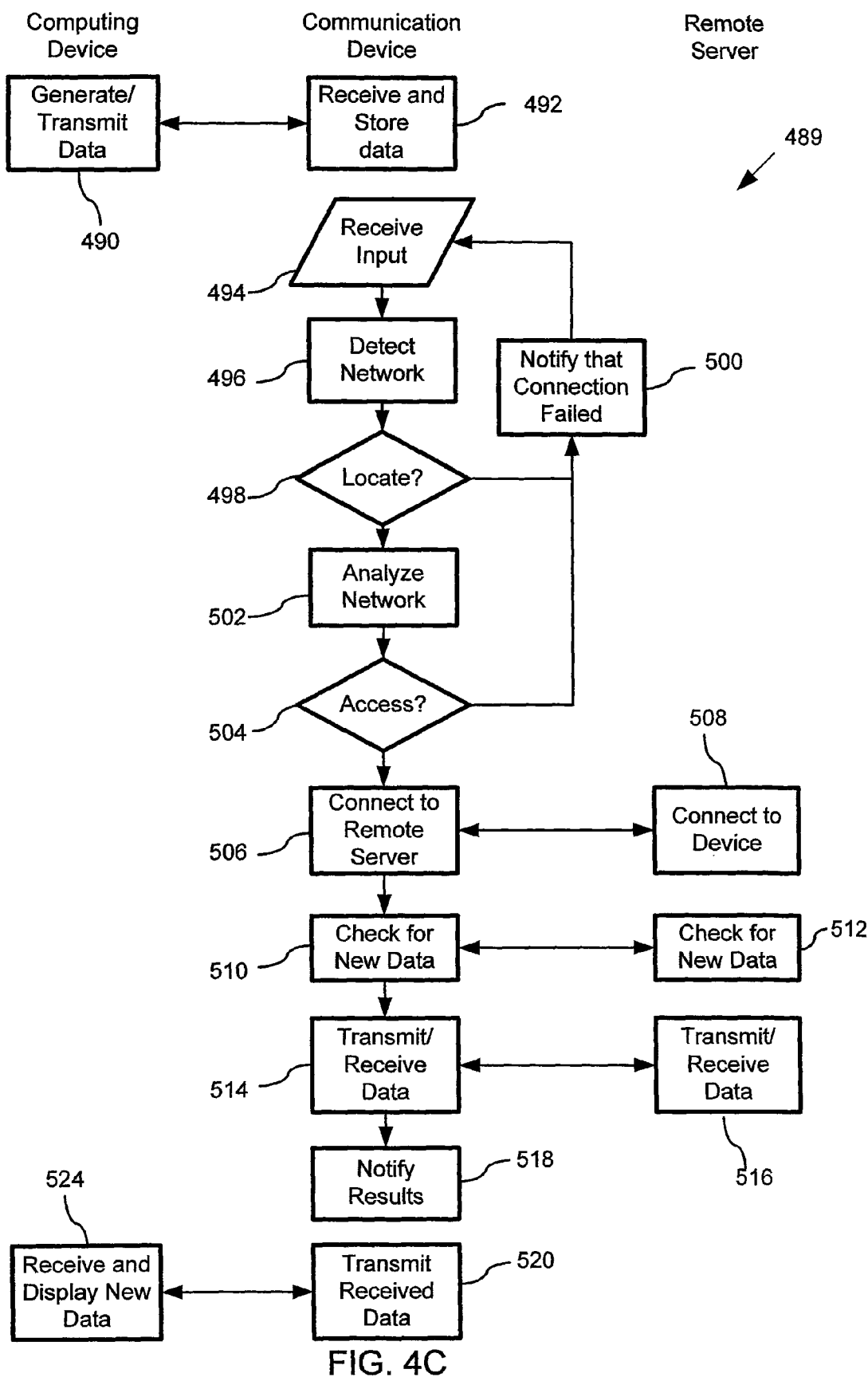
FIG. 4C is a flow chart of a method for transferring data, according to an embodiment of the invention.

FIG. 4C is a flow chart of a method 489 for checking electronic mail. At any time, the communication device 102 (FIG. 1) may be plugged into an external computing device 106, 108 or 110 (FIG. 1). Thereafter, the computing device may transmit data, such as weblog updates or Web-site updates, to the communication device at steps 490. The communication device then receives and stores the received data in the upload database 236 (FIG. 2A) at step 492. These data are any data that a user of an external computing device wants to send, but cannot send immediately, as no network connection existed at the time the data were generated. For example, a user may generate a weblog update on her laptop while travelling on an airplane that does not have Internet access. These data are then transmitted to the communication device, such as via a USB connection, for later transmittal to a remote server. Before landing, the user can disconnect the communication device from the laptop and pack the laptop away.

Also at any time, especially when the communication device is not coupled to the external computing device, i.e., when it is acting as a stand-alone device, a user can select the "data transfer" button 252 (FIG. 2B) to synchronize data on the communication device and a remote server 114 (FIG. 1). Once the data transfer button is depressed, the communication device receives the input, at step 494, and the wireless detector procedures 232 (FIG. 2A) in combination with the wireless network detector 214 (FIG. 2A) proceed to detect the presence of one or more wireless networks at step 496. If a wireless network is not located (498—No), then the user is notified of such a failure at step 500, and the process is repeated. Notification may take the form of displaying an LED indicating that no wireless network was located.

If a wireless network is located (498—Yes), then the wireless detector procedures 232 (FIG. 2A) in combination with the wireless network detector 214 (FIG. 2A) proceed to analyze the detected wireless network at step 502. Analysis of the network may include determining: the strength of the network; the type of network, i.e., 802.11a, 802.11b, 802.11g or BLUETOOTH; whether the network is public or private; whether the network is open or closed; whether the network is encrypted or non-encrypted; and/or whether the network is free or not.

The results of the analysis indicate whether the connection device can access the network at step 504. For example, if the network communicates using supported protocols and the network is free and public, the communication device may access the network. Also, if the communication device had previously been configured at step 404 (FIG. 4A) to access private or non-free wireless networks, then the communication device can access the wireless network. If the detected wireless network cannot be accessed (504—No), then the user is notified of such a failure at step 500, and the process is repeated. Notification may take the form of displaying an LED indicating that access failed.

If the detected wireless network can be accessed (504—Yes), then the communication procedures 228 (FIG. 2A) and the transfer procedures 246 (FIG. 2A) on the communication device connect to the remote server 114 (FIG. 1) via the WAP 104 (FIG. 1) at step 506. Similarly, the remote server connects to the communication device 102 (FIG. 1) via the WAP 104 (FIG. 1) at step 508. The transfer procedures 246 (FIG. 2A) then check the remote server for new data at steps 510 and 512. The transfer procedures 246 (FIG. 2A) then transmit any data stored in the upload database 236 (FIG. 2A) to the remote server, at step 514, which receives the data at step 516. Similarly, the remote server transmits any new data to the communication device, at step 516, which receives them at step 514. The communication device then notifies the user of the receipt or transmittal of data at step 518. For example, the communication device illuminates LED's displaying that data were uploaded (U/L) or downloaded (D/L), as shown in FIG. 2B.

At any time thereafter, the user may plug the communication device into an external computing device and have the communication device transmit the received data to the external computing device at step 520. These new data are received by the external computing device and displayed to the user at step 524.

In an alternative embodiment, the user never needs to press the "messages" button 254 (FIG. 2B). Rather, the communication device periodically attempts to detect an accessible wireless network. Once an accessible wireless network has been detected, the data are automatically sent and/or received by the communication device. Users may be alerted of downloaded data by an audible signal generated by an audio output device 216 (FIG. 2A).

In another embodiment, the user may manually elect to send files wirelessly to another device (either a personal computer or server)., in a similar manner to what is currently done with pendrive USB memory devices, such as when transferring files from one personal computer to another.

In yet another embodiment, the communications device can be used with a cellular telephone to transmit messages or data over a cellular telephone network. For example, a user on an airplane can write email messages on their laptop and save the messages to the communication device. When off the airplane, the communication device can be plugged into the user's cellular telephone and the messages or data sent and/or received at the push of a button. Any email messages received can be reviewed later by plugging the communication device into the user's laptop.

In other embodiments, the communications device may be coupled directly to a local area network (LAN). For example, the communication device may include a male and/or female Ethernet plug or jack. Also in some embodiments, the communication device may be configured to receive external memory cards, such as compact flash cards or the like to increase the useable memory of the device.

The foregoing descriptions of specific embodiments of the present invention are presented for purposes of illustration and description. For example, any methods described herein are merely examples intended to illustrate one way of performing the invention. They are not intended to be exhaustive or to limit the invention to the precise forms disclosed. Obviously many modifications and variations are possible in view of the above teachings. For example, the device may be used as a straight USB keychain memory device (for swapping files between computers).

Also, any figures described herein are not drawn to scale. The embodiments were chosen and described in order to best explain the principles of the invention and its practical applications, to thereby enable others skilled in the art to best utilize the invention and various embodiments with various modifications as are suited to the particular use contemplated. Furthermore, the order of steps in the method are not necessarily intended to occur in the sequence laid out. Please note that aspects of the present teachings may be further understood in light of the examples described above, which should not be construed as limiting the scope of the present invention. It is intended that the scope of the invention be defined by the following claims and their equivalents.

I claim:

1. A wireless network device connectable and disconnectable from an external computing device comprising:
   a detection module that can detect presence of a wireless network;
   wherein said detection module determines if said wireless network is encrypted or unencrypted, open or closed, public or private and free or pay;
   a wireless adapter module that can communicate on said wireless network;
   wherein said wireless adapter module is adapted to communicate with the external computing device which is provided with one or more service set identifiers or one or more encryption keys allowing access to at least a particular network, and
   wherein said wireless adapter module can perform network communications at an OSI data link level;
   an internal memory in the wireless network device that can store an email message associated with a particular email account from an external computer destined for a remote server and transfer an internally stored email message from a remote server to the external computer when the wireless network device is connected to the external computer;
   the wireless network device being configured to transmit stored email messages destined for said remote server over the wireless network when not connected to said external computer;
   the wireless network device also being configured to receive over the wireless network and store email messages from the remote server when not connected to said external computer.

* * * * *